(12) United States Patent
Barth et al.

(10) Patent No.: US 6,798,706 B2
(45) Date of Patent: Sep. 28, 2004

(54) INTEGRATED CIRCUIT WITH TEMPERATURE SENSOR AND METHOD FOR HEATING THE CIRCUIT

(75) Inventors: Roland Barth, Sunnyvale, CA (US); Alexander Benedix, München (DE); Reinhard Düregger, Poing (DE); Stephan Grosse, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/352,824

(22) Filed: Jan. 28, 2003

(65) Prior Publication Data

US 2003/0142724 A1 Jul. 31, 2003

Related U.S. Application Data

(63) Continuation of application No. PCT/DE01/02802, filed on Jul. 24, 2001.

(30) Foreign Application Priority Data

Jul. 28, 2000 (DE) .......................................... 100 36 914

(51) Int. Cl.[7] .............................. G11C 7/04; G11C 7/14; H01L 23/58; H01L 27/10
(52) U.S. Cl. ........................................ 365/211; 219/209
(58) Field of Search ................................. 374/178, 100, 374/101, 102, 103, 141; 219/209, 494, 548; 365/210, 211; G11C 7/04

(56) References Cited

U.S. PATENT DOCUMENTS

| | | | | | |
|---|---|---|---|---|---|
| 3,835,458 | A | * | 9/1974 | Mrazek | 365/211 |
| 5,233,161 | A | * | 8/1993 | Farwell et al. | 219/209 |
| 5,276,843 | A | * | 1/1994 | Tillinghast et al. | 365/211 |
| 5,285,418 | A | * | 2/1994 | Yamaguchi | 365/211 |
| 5,784,328 | A | * | 7/1998 | Irrinki et al. | 365/222 |
| 5,875,142 | A | | 2/1999 | Chevallier | 365/212 |
| 5,894,447 | A | * | 4/1999 | Takashima | 365/210 |
| 6,002,240 | A | | 12/1999 | McMahan et al. | 320/150 |
| 6,009,033 | A | | 12/1999 | Li et al. | 365/212 |
| 6,021,076 | A | * | 2/2000 | Woo et al. | 365/211 |
| 6,089,751 | A | * | 7/2000 | Conover et al. | 219/209 |
| 6,308,121 | B1 | | 10/2001 | Ulm | 701/35 |
| 6,373,768 | B2 | * | 4/2002 | Woo et al. | 365/211 |
| 6,476,627 | B1 | * | 11/2002 | Pelissier et al. | 219/209 |
| 6,556,496 | B2 | * | 4/2003 | Benedix et al. | 365/211 |
| 6,608,790 | B2 | * | 8/2003 | Tran et al. | 365/211 |
| 6,628,558 | B2 | * | 9/2003 | Fiscus | 365/222 |
| 6,662,278 | B1 | * | 12/2003 | Kahn et al. | 365/211 |
| 6,724,674 | B2 | * | 4/2004 | Abraham et al. | 365/211 |
| 2002/0030239 | A1 | * | 3/2002 | Der Ropp | 257/467 |

FOREIGN PATENT DOCUMENTS

| | | |
|---|---|---|
| DE | 196 38 973 A1 | 4/1998 |
| DE | 100 34 262 C1 | 9/2001 |
| EP | 1174907 A2 * | 1/2002 ........... B60R/16/02 |

OTHER PUBLICATIONS

Derwent 2001–523511 Abstract publication of DE 10034262 C, (Von Der Ropp et al.), published Dec. 2002 (3 pages).*

* cited by examiner

Primary Examiner—Diego Gutierrez
Assistant Examiner—Stanley J. Pruchnic, Jr.
(74) Attorney, Agent, or Firm—Laurence A. Greenberg; Werner H. Stemer; Gregory L. Mayback

(57) ABSTRACT

A temperature sensor is integrated together with an integrated circuit on a chip, the sensor delivering a temperature-dependent measuring signal or at least emitting a signal when the chip temperature falls below a specific prescribed value. For such an eventuality, the chip includes a special circuit device thereon, by which a current flow is generated through a provided structure of electrical conductors that keeps the temperature of the integrated circuit above a prescribed minimum temperature.

5 Claims, 1 Drawing Sheet

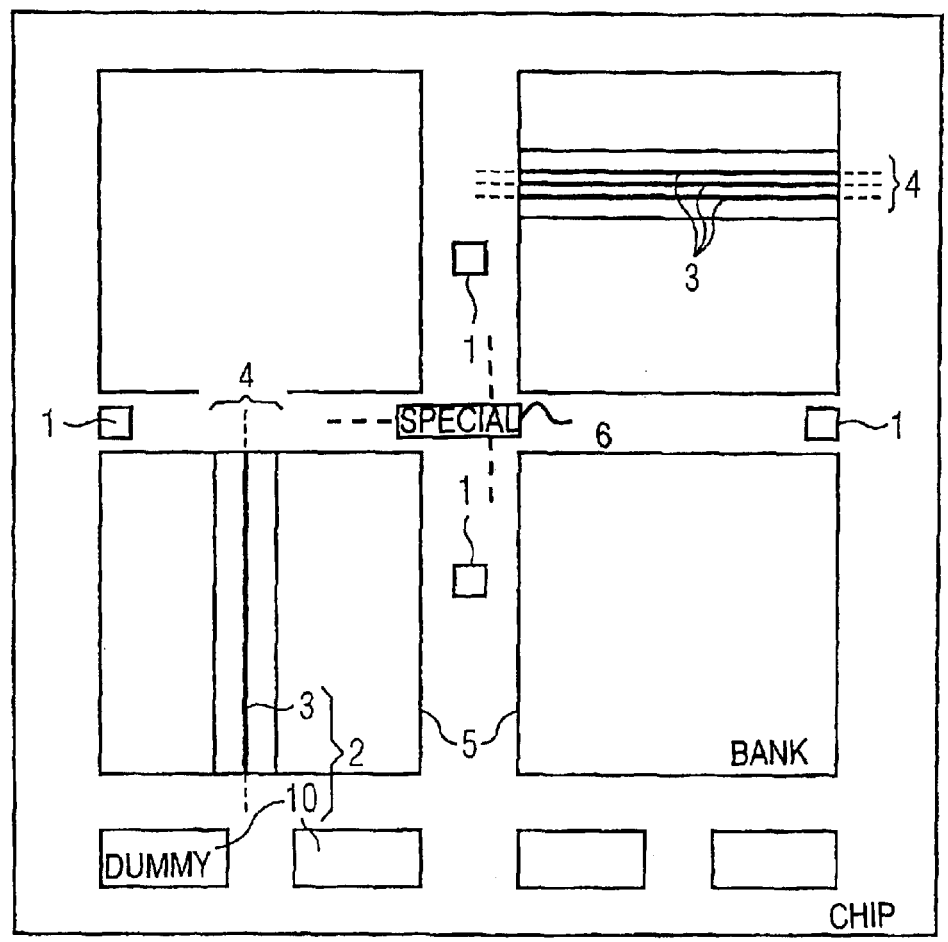

INTEGRATED CIRCUIT WITH TEMPERATURE SENSOR AND METHOD FOR HEATING THE CIRCUIT

CROSS-REFERENCE TO RELATED APPLICATION

This application is a continuation of copending International Application No. PCT/DE01/02802, filed Jul. 24, 2001, which designated the United States and was not published in English.

BACKGROUND OF THE INVENTION

Field of the Invention

The invention relates to an integrated circuit on a semiconductor chip in which a temperature sensor is integrated and a method for heating the circuit.

Integrated circuits work in a very wide temperature range. If the circuit is required to work perfectly at very low temperatures as well, individual specimens of the circuit must also be tested at low temperatures at least by random sampling. But this additional selection substantially decreases the yield of usable circuits. Such a problem occurs particularly with memory modules such as DRAMs.

SUMMARY OF THE INVENTION

It is accordingly an object of the invention to provide an integrated circuit with temperature sensor and a method for heating the circuit that overcome the hereinafore-mentioned disadvantages of the heretofore-known devices and methods of this general type and that has a high operational reliability even at low temperatures.

With the foregoing and other objects in view, there is provided, in accordance with the invention, an integrated circuit on a semiconductor chip, including an integrated temperature sensor detecting a temperature of the semiconductor chip and providing a measured temperature signal, a structure of electrical conductors, and a special circuit device connected to the integrated temperature sensor and to at least some of the conductors, the special circuit device generating, dependent upon the measured temperature signal, current flow through the at least some of the conductors when the detected temperature falls below a given temperature value.

In the inventive integrated circuit on a semiconductor chip, at least one temperature sensor is integrated on the chip together with the circuit, which sensor delivers a temperature-dependent measuring signal or at least emits a signal when the chip temperature falls below a specific prescribed value. For this eventuality, a special circuit device is provided on the chip, which brings about a current flow through a provided structure of electrical conductors, thereby generating heat in a sufficient quantity to hold the temperature of the integrated circuit above a prescribed minimum temperature. Not only does such an integrated circuit increase the yield of chips that function perfectly at low temperatures, but it also can be used at lower temperatures than have been possible hitherto.

The structure of electrical conductors is simply to be configured such that the current flowing through generates a sufficient quantity of heat the ohmic resistance of the conductor so as to achieve the desired thermal effect. These conductors can be the conductive tracks that are provided on an integrated circuit anyway, these being conductively connected to the special circuit device for generating the current flow as needed.

In a semiconductor memory, the conductors of individual memory blocks (banks) that are not needed for a presently occurring store or write operation can be utilized. The conductors are the address lines over which the stored signals are sent to the memory cells or read therefrom. Which banks of the memory chip are currently available for generating a heating current is determined by the drive circuit of the memory. The special circuit device is interconnected, as required, with the conductors of the deactivated memory blocks, which are not being used at present.

In accordance with another feature of the invention, there is provided a memory having operating states, subregions, and address lines, the conductors forming at least some of the address lines in a respective one of the subregion, the at least some of the address lines connected to the special circuit device, preferably, according to at least one of the operating states of the memory.

In accordance with a further feature of the invention, there is provided a memory cell field having a margin and dummy cells are disposed at the margin and form at least some of the conductors.

In accordance with an added feature of the invention, there is provided a margin, the conductors being formed by dummy cells at the margin.

In accordance with an additional feature of the invention, the special circuit device is programmed to drive the memory and to modify the operating states of the memory.

In accordance with yet another feature of the invention, the special circuit device is programmed to drive the memory and to modify operating states of the memory.

In accordance with yet a further feature of the invention, the special circuit device is to be driven by external commands to modify the operating states of the memory.

In accordance with yet an added feature of the invention, the special circuit device is programmed to drive the memory with activate and precharge commands and to modify the operating states of the memory.

In accordance with yet an additional feature of the invention, the special circuit device to be driven by external activate and precharge commands to modify an operating state of the memory.

In accordance with again another feature of the invention, the special circuit device generates signals in at least one given operating state of the memory effectuating a cutoff of current flow in at least some of the conductors when current is flowing through the conductors.

In accordance with again a further feature of the invention, the integrated circuit has operating states and the special circuit device generates signals effectuating a cutoff of current flow in at least one of the operating states in at least some of the conductors when current is flowing through the conductors.

With the objects of the invention in view, in a semiconductor chip, there is also provided an integrated circuit including an integrated temperature sensor detecting a temperature of the semiconductor chip and providing a measured temperature signal, a structure of electrical conductors, and a special circuit device connected to the integrated temperature sensor and to at least some of the conductors, the special circuit device generating current flow through the at least some of the conductors when the detected temperature falls below a given temperature value.

With the objects of the invention in view, there is also provided a method for heating an integrated circuit, including the steps of providing a semiconductor chip having a structure of electrical conductors, integrated temperature sensor, and the integrated circuit, detecting a temperature of the semiconductor chip with the integrated temperature sensor and generating a measured temperature signal, connecting a special circuit device to the integrated temperature sensor and to at least some of the conductors, and generating, dependent upon the measured temperature signal, current flow with the special circuit device through the at least some conductors when the detected temperature falls below a given temperature value.

Other features that are considered as characteristic for the invention are set forth in the appended claims.

Although the invention is illustrated and described herein as embodied in an integrated circuit with temperature sensor and a method for heating the circuit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawing.

BRIEF DESCRIPTION OF THE DRAWING

The FIGURE is a schematic plan view of an exemplary integrated circuit according to the invention.

DESCRIPTION OF THE PREFERRED EMBODIMENTS

Referring now to the single FIGURE of the drawing, it is seen that several temperature sensors 1 are disposed on the top surface of the semiconductor chip. The electrical conductors 2 are formed by the address lines 3 of a respective inactive subregion 4 of a memory or by dummy cells 10 at the margin of the memory cell field. The different banks 5 of the memory are not all active at the same time. Therefore, the conductors provided in the inactive banks can be utilized for heating the chip. The selection of the conductors and the generation of the current flow occur in the special circuit device 6, which is diagrammatically illustrated in the FIGURE. Like the elements of the drive circuit of the memory, the electronic elements of the special circuit device 6 can, for example, also be disposed between the memory banks or at the margin of the semiconductor chip.

In principle, temperature sensor 1 can be any microelectronic integratable temperature sensor. Such components are known per se and have long been integrated on one chip with the appertaining components of an electronic drive and evaluation circuit. Thus, the inventive integrated circuit makes no additional demands from the standpoint of fabrication technology.

The only demand on the electrical conductor that is utilized for heat generation is that it have a suitably high ohmic resistance and be so structured that the generated heat reaches the regions of the chip that require heat. It is not necessary that the conductor connect the poles of the applied potential difference to one another. In a semiconductor chip, in particular, it is advantageous to utilize a sufficiently large capacity that is already present on the chip, which can be formed by contact surfaces, by charging it with an alternating current (a.c.) voltage with a sufficiently high frequency. Because the capacity acts increasingly like a short circuit as the a.c. voltage frequency rises, a sufficiently large current flow for heating the ohmic resistances of the supply lines can also be generated this way.

In semiconductor chips that are provided as memory chips for a DRAM, it is possible to realize a heating function by refresh cycles that follow one another in rapid succession. One possible implementation of such a heating function makes use of the presently inactive regions of the memory banks (e.g., four segments of the on-chip banks are available in a standard SDRAM), which are utilized for heating and are operated by activate and precharge commands.

To prevent a possible data loss due to the high demand on the memory cells, it is possible, additionally or preferably exclusively, to utilize the dummy cells 10 at the margin of the memory cell field for the heat generation. These dummy cells 10 are usually provided to improve the optical characteristics of the chip at the cell field margin for the lithography processing steps. Because they, generally, do not have their own electrical function, they are preferred as heat conductors.

The heating function that is controlled by the special circuit device can also be interrupted by external commands (activate, precharge, read, etc.) if need be so that the functionality of an inventive memory cell configuration is not compromised. In particular, the heating function can be indicated by a signal that is generated by the special circuit device when there is current flowing though the heat conductors provided for such a purpose. This signal can be supplied to an external circuit that interrupts the heating if need be. Preferably, in certain provided operating states of the integrated circuit, the interruption of the current flow occurs automatically by the special circuit device itself. The special circuit device is, then, provided for controlling the overall heating function so as not to compromise the function of the actual integrated circuit of the semiconductor chip in any way, but, rather, merely to provide for a minimum chip temperature that guarantees the correct operating mode.

We claim:

1. A method for holding a temperature of a semiconductor memory device above a prescribed minimum temperature for ensuring that the semiconductor memory device correctly operates, the method which comprises:
   providing the semiconductor memory device with a memory cell field having a plurality of individual memory blocks and plurality of dummy cells located at an edge of the memory cell field;
   ensuring that the temperature of semiconductor memory device is above the prescribed minimum temperature for normal operation of the semiconductor memory device by applying a heating current to the plurality of dummy cells and/or to a plurality of conductors of at least one of the plurality of individual memory blocks not simultaneously being used for read or write operations; and
   cutting off the heating current to ensure that a functionality of the semiconductor memory device is not compromised during the normal operation of the semiconductor memory device.

2. The method according to claim 1, which further comprises using an external circuit to control the step of cutting off the heating current.

3. The method according to claim 1, which further comprises using external commands to initiate the step of cutting off the heating current.

4. The method according to claim 3, which further comprises selecting the external commands from a group consisting of activate commands, precharge commands, and read commands.

5. The method according to claim 1, which further comprises: integrating a special circuit device in the semiconductor memory device; and using the special circuit device to control the step of cutting off the heating current.

* * * * *